US010169283B2

(12) United States Patent
Mathews et al.

(10) Patent No.: US 10,169,283 B2
(45) Date of Patent: Jan. 1, 2019

(54) CUSTOM DATA TRANSFER CONNECTOR AND ADAPTER

(71) Applicant: ARRIS Enterprises LLC, Suwanee, GA (US)

(72) Inventors: Carol Mathews, Havertown, PA (US); Jamie J. Swift, Levittown, PA (US); Joseph W. Scabarozi, Jr., Chalfont, PA (US); Steven M. Corso, Philadelphia, PA (US); Charles F. Niesley, Lansdale, PA (US); Frederick W. Schimmel, Gibbsboro, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/411,441

(22) Filed: Jan. 20, 2017

(65) Prior Publication Data

US 2017/0206181 A1    Jul. 20, 2017

Related U.S. Application Data

(60) Provisional application No. 62/280,830, filed on Jan. 20, 2016.

(51) Int. Cl.
*H01R 24/00*   (2011.01)
*G06F 13/40*   (2006.01)
(Continued)

(52) U.S. Cl.
CPC ........ *G06F 13/4068* (2013.01); *G06F 1/1632* (2013.01); *G06F 1/187* (2013.01);
(Continued)

(58) Field of Classification Search
CPC .................................................. G06F 13/4068
(Continued)

(56) References Cited

U.S. PATENT DOCUMENTS 5,253,142 A  * 10/1993  Weng ...................... E05C 19/06
                                                       16/223
6,183,307 B1 *  2/2001  Laity ...................... H01R 31/06
                                                      361/679.4

(Continued)

FOREIGN PATENT DOCUMENTS

DE    202005000419 U1    3/2005
EP         1848258 A1   10/2007
WO       2008009901 A2    1/2008

OTHER PUBLICATIONS

PCT International Search Report for PCT/US2017/014356; dated Mar. 29, 2017.

*Primary Examiner* — Tulsidas C Patel
*Assistant Examiner* — Peter G Leigh
(74) *Attorney, Agent, or Firm* — Bart A. Perkins

(57) ABSTRACT

Described herein is a main board serial AT attachment (SATA) connector and SATA adapter that permits the assembly or disassembly of a STB (set-top box) and HDD (hard disk drive) dock without requiring that the unit be opened by a skilled technician. The SATA connector and SATA adapter may be keyed to prevent tampering or unauthorized connection of an external hard drive. Alignment and guide features may be included for easy assembly of the STB and HDD dock. The connector and adapter may be designed in such a way as to allow for simple modifications to correspond with various STB and HDD dock designs by adjusting the mating height of the connector and adapter.

3 Claims, 5 Drawing Sheets

(51) Int. Cl.
  *G06F 13/42*   (2006.01)
  *H01R 24/60*   (2011.01)
  *G06F 1/18*    (2006.01)
  *H01R 31/06*   (2006.01)
  *H04N 21/00*   (2011.01)
  *G06F 1/16*    (2006.01)
  *G06F 3/00*    (2006.01)
  *G11B 33/12*   (2006.01)
  *H01R 107/00*  (2006.01)

(52) U.S. Cl.
  CPC ............ *G06F 3/00* (2013.01); *G06F 13/4282* (2013.01); *G11B 33/122* (2013.01); *H01R 24/60* (2013.01); *H01R 31/06* (2013.01); *H04N 21/00* (2013.01); *G06F 2213/0032* (2013.01); *H01R 2107/00* (2013.01)

(58) Field of Classification Search
  USPC ........................................................ 439/676
  See application file for complete search history.

(56) References Cited

U.S. PATENT DOCUMENTS

| | | | | |
|---|---|---|---|---|
| 7,029,301 B2* | 4/2006 | Ootori | ................ | H01R 13/6315 439/248 |
| 7,151,673 B2* | 12/2006 | Le | .................... | G06K 19/07741 361/727 |
| 7,643,283 B2* | 1/2010 | Jubelirer | ............... | G06F 1/1632 361/679.41 |
| 7,727,024 B2* | 6/2010 | Chou | ................... | H01R 31/065 439/638 |
| 7,972,160 B2* | 7/2011 | Jeong | .................... | H01R 31/06 439/304 |
| 8,007,289 B2* | 8/2011 | Bandhu | .............. | H01R 13/6271 439/638 |
| 8,083,195 B2* | 12/2011 | Osada | .................... | F16M 13/00 248/176.1 |
| 8,529,280 B2* | 9/2013 | Lim | ........................ | H01R 12/73 439/345 |
| 9,037,771 B2* | 5/2015 | Ota | ........................ | G06F 13/387 710/316 |
| 2003/0109179 A1* | 6/2003 | Kaneshiro | ............ | G06K 7/0021 439/638 |
| 2004/0057199 A1* | 3/2004 | Azuchi | ................. | G06F 1/1626 361/679.3 |
| 2004/0150944 A1* | 8/2004 | Byrne | ................... | H02J 7/0003 348/207.99 |
| 2005/0120153 A1* | 6/2005 | Perez | .................... | G06F 13/409 710/62 |
| 2005/0148224 A1* | 7/2005 | Ootori | ............... | H01R 13/6315 439/179 |
| 2005/0255895 A1* | 11/2005 | Lee | ........................ | G06F 1/1632 455/573 |
| 2008/0152305 A1 | 6/2008 | Ziegler | | |
| 2009/0015198 A1* | 1/2009 | Brandenburg | ........ | H02J 7/0044 320/115 |
| 2009/0233490 A1* | 9/2009 | Chou | .................... | H01R 31/065 439/638 |
| 2009/0258513 A1* | 10/2009 | Wu | ........................ | H01R 13/629 439/78 |
| 2015/0255935 A1* | 9/2015 | Sunaga | .................. | H01R 24/60 439/676 |

* cited by examiner

CUSTOM DATA TRANSFER CONNECTOR AND ADAPTER

CROSS REFERENCE TO RELATED APPLICATION

This application is a non-provisional application claiming the benefit of U.S. Provisional Application Ser. No. 62/280,830, entitled "Custom Data Transfer Connector and Adapter," which was filed on Jan. 20, 2016, and is incorporated herein by reference in its entirety.

TECHNICAL FIELD

This disclosure relates to a custom data transfer connector and adapter.

BACKGROUND

Initial industrial design concepts and customer requirements typically limited the assembly and disassembly of a set-top box (STB) and hard disk drive (HDD) dock enclosures so as to prevent non-skilled technicians, using traditional tools, from assembling and disassembling the coupled devices. Typically, the coupling of STBs to HDD dock enclosures is designed to limit access to the internal features of the enclosure. For example, typical designs would not permit the opening of the STB to install the HDD or access an internal cable assembly. Therefore, it is desirable to improve systems and apparatuses to provide a robust and customizable interface for the transfer of data.

BRIEF DESCRIPTION OF THE DRAWINGS

Like reference numbers and designations in the various drawings indicate like elements.

DETAILED DESCRIPTION

Described herein is a main board serial AT attachment (SATA) connector and SATA adapter that permits the assembly or disassembly of a STB (set-top box) and HDD (hard disk drive) dock without requiring that the unit be opened by a skilled technician. The SATA connector and SATA adapter may be keyed to prevent tampering or unauthorized connection of an external hard drive. Alignment and guide features may be included for easy assembly of the STB and HDD dock. The connector and adapter may be designed in such a way as to allow for simple modifications to correspond with various STB and HDD dock designs by adjusting the mating height of the connector and adapter.

Figure 1:
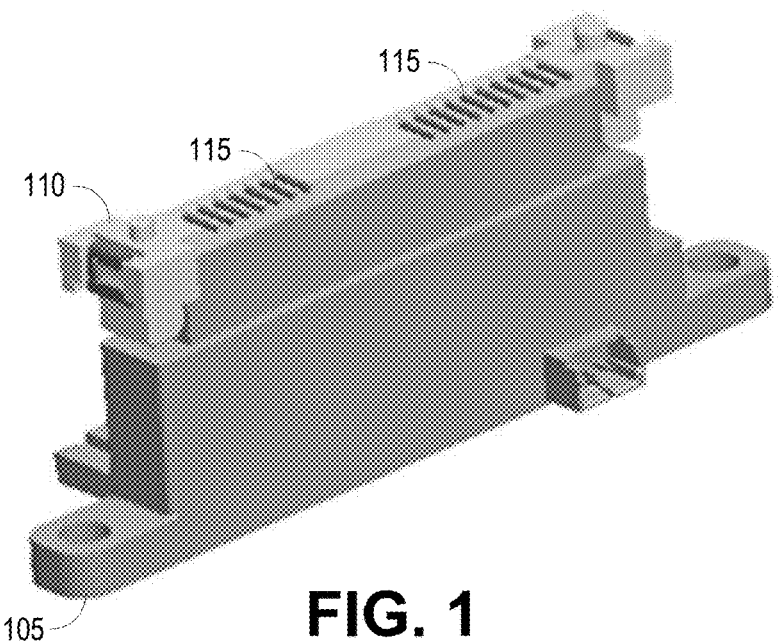
FIG. 1 is a front perspective view of an adapter base and a data transfer adapter.

FIG. 1 is a front perspective view of an adapter base 105 and a data transfer adapter 110. In embodiments, features and alignment of a pinout configuration 115 of the data transfer adapter 110 may be customized to align with a specific pin configuration of a data transfer connector attached to another device (e.g., set-top box (STB)). For example, features and alignment of the pinout configuration 115 may be customized to prevent unauthorized assembly of an external hard drive. The features and alignment of the pinout configuration 115 may be an alignment or orientation that is different than a pinout and connector alignment or orientation as laid out by a design requirement or standard (e.g., SATA (serial AT attachment) standard layout). In embodiments, the features and alignment of the pinout configuration 115 may be unique such that a specific data transfer connector of another device will accept the data transfer adapter 110, but will not accept another adapter that has a different connector alignment. It should be understood that the pinout configuration 115 may include an orientation of one or more pinouts or an orientation of one or more connector ports.

Figure 2:
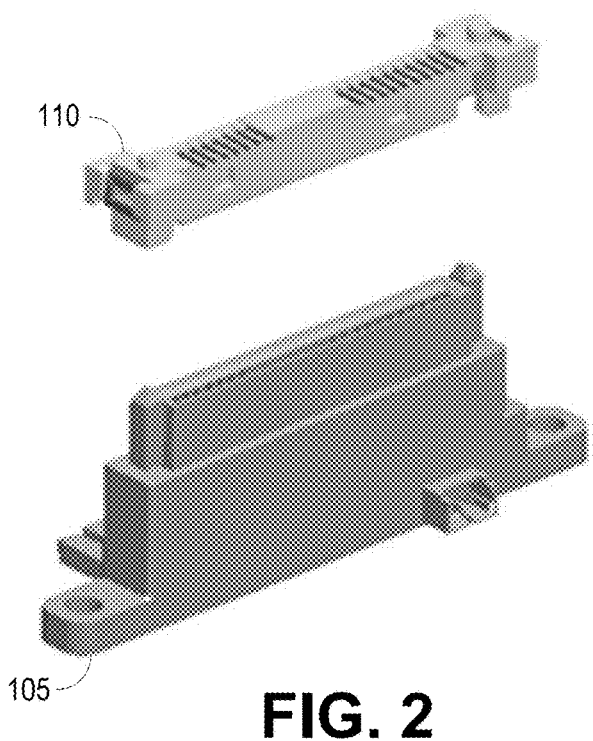
FIG. 2 is an exploded front perspective view of the adapter base and the data transfer adapter.

FIG. 2 is an exploded front perspective view of the adapter base 105 and the data transfer adapter 110. In embodiments, the data transfer adapter 110 may be attached and detached from the adapter base 105. For example, clips at the ends of the data transfer adapter 110 may allow the data transfer adapter 110 to be attached and/or detached from the adapter base 105.

Figure 3:
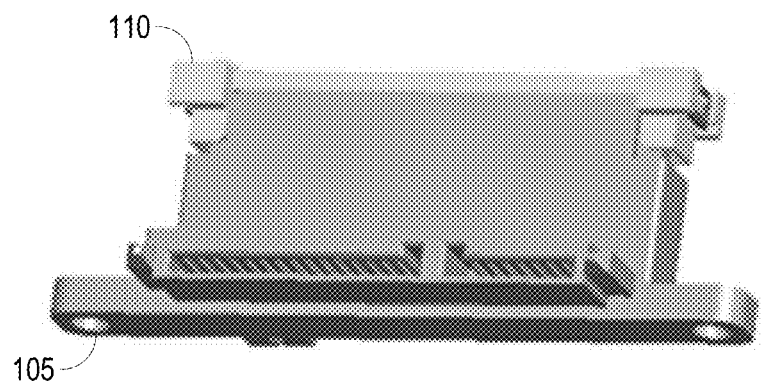
FIG. 3 is a rear perspective view of the adapter base and the data transfer adapter.

FIG. 3 is a rear perspective view of the adapter base 105 and the data transfer adapter 110. The adapter base 105 may be secured or otherwise mounted to a hard disk drive (HDD) or other similar data storage device.

Figure 4:
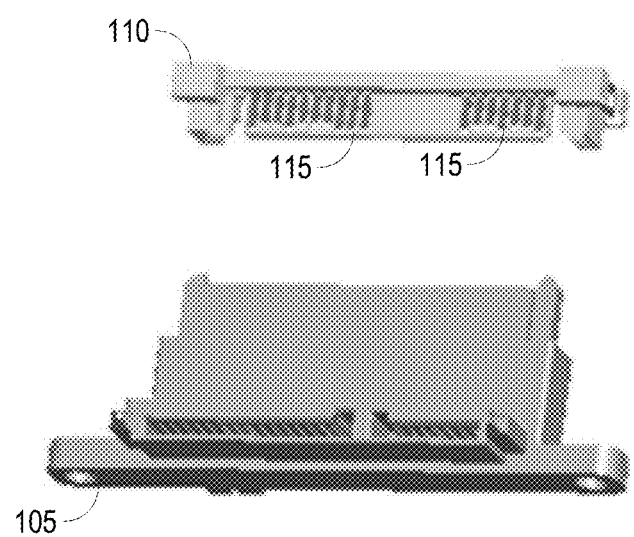
FIG. 4 is an exploded rear perspective view of the data transfer connector and the data transfer adapter.

FIG. 4 is an exploded rear perspective view of the data transfer connector 105 and the data transfer adapter 110. The orientation of the pinout configuration 115 may be such that the pinout configuration 115 is oriented with pins of the adapter base 105.

Figure 5:
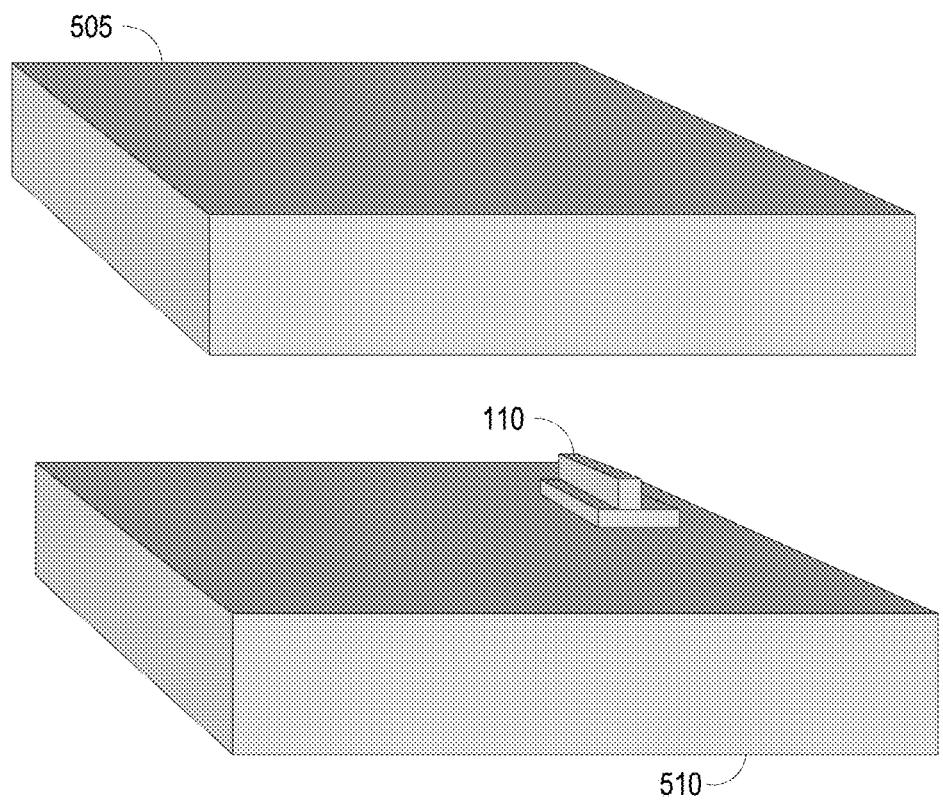
FIG. 5 is an exploded top perspective view of a STB enclosure and a storage device enclosure.

FIG. 5 is an exploded top perspective view of a STB enclosure 505 and a storage device enclosure 510. In embodiments, the data transfer adapter 110 may be positioned on the storage device enclosure 510 so that the data transfer adapter 110 fits into a connector opening in the STB enclosure 505 when the storage device enclosure 510 is temporarily attached to the STB enclosure 505. The data transfer adapter 110 may be customized and may be mounted to the storage device enclosure 510 using, for example, one or more screws or other connectors. The data transfer adapter 110 may include a plurality of connector ports that are oriented within the data transfer adapter 110 according to the positions of pinouts associated with a corresponding connector opening in the STB enclosure 505.

Figure 6:
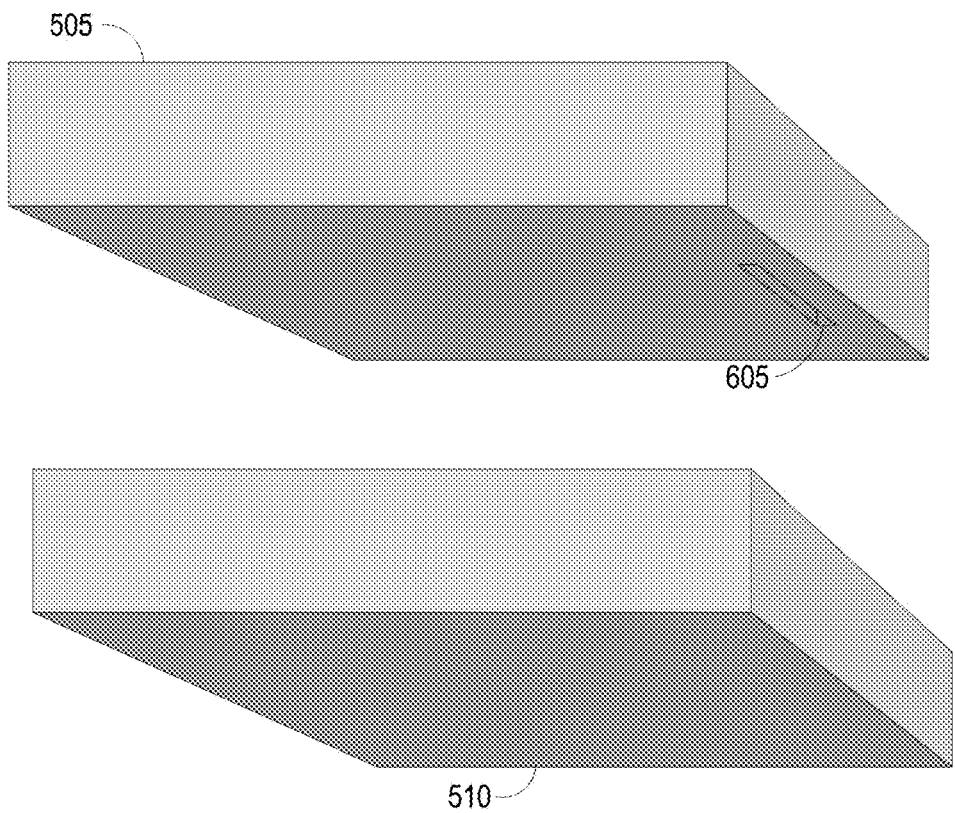
FIG. 6 is an exploded bottom perspective view of the STB enclosure and the storage device enclosure.

FIG. 6 is an exploded bottom perspective view of the STB enclosure 505 and the storage device enclosure 510. In embodiments, a connector opening 605 may be positioned on the STB enclosure 505 so that the data transfer adapter (e.g., data transfer adapter 110 of FIG. 1) of the storage device enclosure 510 fits into the connector opening 605 when the storage device enclosure 510 is temporarily attached to the STB enclosure 505. In embodiments, the connector opening 605 may be customized and may be mounted or soldered to the bottom of the STB enclosure 505 main board. For example, the connector opening 605 may include connector ports oriented within the connector opening 605 according to the positions of corresponding pinouts of the data transfer adapter 110. It should be understood that the connector opening 605 may include an orientation of one or more pinouts or an orientation of one or more connector ports.

Figure 7:
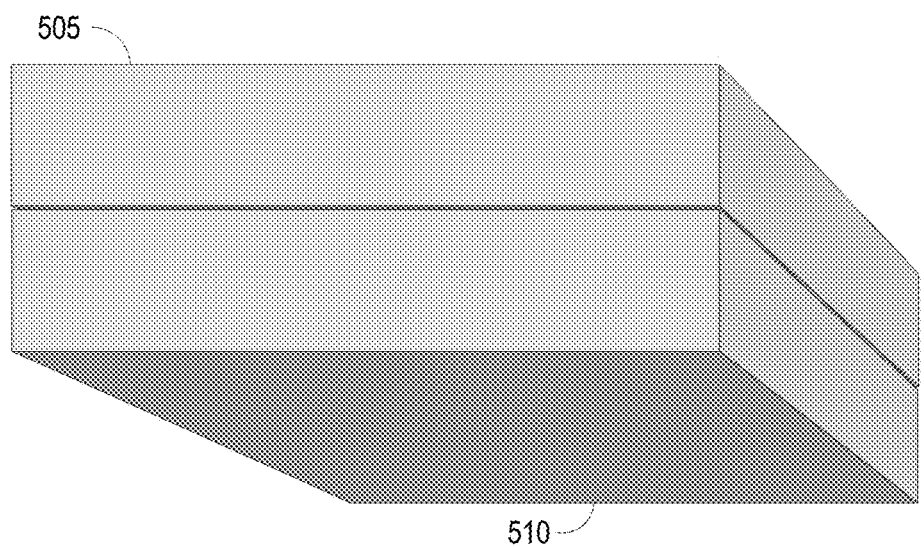
FIG. 7 shows the STB enclosure coupled to the storage device enclosure.

FIG. 7 shows the STB enclosure 505 coupled to the storage device enclosure 510. The STB enclosure 505 and the storage device enclosure 510 may be temporarily attached to each other, and a data transfer interface or bus (e.g., data transfer adapter 110 of FIG. 1 and connector opening 605 of FIG. 6) may be used to provide the STB with access to content stored at the storage device. It should be understood that the data transfer interface described herein may be used for data transfers taking place between various other devices.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

We claim:

1. A system for transferring data between a first device and a second device, the system comprising:
   an adapter base, wherein the adapter base is attached to the first device, and wherein the adapter base is secured to an enclosure of the first device;
   a data transfer adapter, wherein the data transfer adapter comprises a serial AT attachment adapter, wherein the data transfer adapter is attached to the adapter base, and wherein the data transfer adapter comprises a clip at each end of the data transfer adapter, the clips providing for an attachment of the data transfer adapter to the adapter base and for a removal of the data transfer adapter from the adapter base; and
   a connector opening coupled to the second device, wherein the connector opening comprises a serial AT attachment connector, wherein the connector opening is mounted to the bottom of an enclosure of the second device, and wherein the connector opening comprises one or more connector ports positioned within the connector opening according to a first orientation;
   wherein the data transfer adapter comprises a pinout configuration that mates with the one or more connector ports positioned within the connector opening according to the first orientation, wherein the pinout configuration of the data transfer adapter mates with the one or more connector ports positioned within the connector opening when the enclosure of the first device is temporarily attached to the enclosure of the second device.

2. The system of claim 1, wherein the first device comprises a storage device.

3. The system of claim 1, wherein the second device comprises a set-top box.

\* \* \* \* \*